(12) United States Patent
Fong et al.

(10) Patent No.: US 9,404,756 B2
(45) Date of Patent: Aug. 2, 2016

(54) ADAPTIVE MAPPING WITH SPATIAL SUMMARIES OF SENSOR DATA

(71) Applicant: iRobot Corporation, Bedford, MA (US)

(72) Inventors: Philip Fong, Pasadena, CA (US); Ethan Eade, Seattle, CA (US); Mario E. Munich, Sierra Madre, CA (US)

(73) Assignee: iRobot Corporation, Bedforf, MA (US)

( * ) Notice: Subject to any disclaimer, the term of this patent is extended or adjusted under 35 U.S.C. 154(b) by 0 days.

(21) Appl. No.: 14/944,152

(22) Filed: Nov. 17, 2015

(65) Prior Publication Data

US 2016/0069691 A1 Mar. 10, 2016

Related U.S. Application Data

(63) Continuation of application No. 14/307,402, filed on Jun. 17, 2014, now Pat. No. 9,218,003, which is a continuation of application No. 13/632,997, filed on Oct. 1, 2012, now Pat. No. 8,798,840.

(60) Provisional application No. 61/541,749, filed on Sep. 30, 2011.

(51) Int. Cl.
*G05B 15/00* (2006.01)
*G01C 21/20* (2006.01)
(Continued)

(52) U.S. Cl.
CPC .............. *G01C 21/206* (2013.01); *G01C 21/20* (2013.01); *G01C 21/32* (2013.01); *G05B 15/00* (2013.01);
(Continued)

(58) Field of Classification Search
USPC ......... 701/400, 409, 445, 446, 447, 448, 450, 701/451, 23, 25, 26, 517, 532; 700/259, 25, 700/3, 258; 702/150, 151, 152
See application file for complete search history.

(56) References Cited

U.S. PATENT DOCUMENTS 4,628,453 A 12/1986 Kamejima et al.
4,815,840 A 3/1989 Benayad-Cherif et al.
(Continued)

FOREIGN PATENT DOCUMENTS

EP 0390052 A2 10/1990
EP 2450762 A2 5/2012
(Continued)

OTHER PUBLICATIONS

Jan. 27, 2014 PCT Search Report Written Opinion for International Application No. PCT/US2013/061208.
(Continued)

*Primary Examiner* — Thomas Tarcza
*Assistant Examiner* — Richard Goldman
(74) *Attorney, Agent, or Firm* — Myers Bigel & Sibley, P.A.

(57) ABSTRACT

A system and method for mapping parameter data acquired by a robot mapping system is disclosed. Parameter data characterizing the environment is collected while the robot localizes itself within the environment using landmarks. Parameter data is recorded in a plurality of local grids, i.e., sub-maps associated with the robot position and orientation when the data was collected. The robot is configured to generate new grids or reuse existing grids depending on the robot's current pose, the pose associated with other grids, and the uncertainty of these relative pose estimates. The pose estimates associated with the grids are updated over time as the robot refines its estimates of the locations of landmarks from which determines its pose in the environment. Occupancy maps or other global parameter maps may be generated by rendering local grids into a comprehensive map indicating the parameter data in a global reference frame extending the dimensions of the environment.

11 Claims, 8 Drawing Sheets

(51) Int. Cl.
*G01C 21/32* (2006.01)
*G05D 1/02* (2006.01)
*G05D 1/00* (2006.01)

(52) U.S. Cl.
CPC ............ *G05D 1/0088* (2013.01); *G05D 1/0274* (2013.01); *G05D 2201/0216* (2013.01); *Y10S 901/00* (2013.01)

(56) References Cited

U.S. PATENT DOCUMENTS

| | | | |
|---|---|---|---|
| 4,846,297 A | 7/1989 | Field | |
| 4,942,539 A | 7/1990 | McGee | |
| 4,954,962 A | 9/1990 | Evans et al. | |
| 5,040,116 A | 8/1991 | Evans et al. | |
| 5,083,257 A | 1/1992 | Kennedy | |
| 5,109,425 A | 4/1992 | Lawton | |
| 5,111,401 A | 5/1992 | Everett et al. | |
| 5,144,685 A | 9/1992 | Nasar et al. | |
| 5,155,775 A | 10/1992 | Brown | |
| 5,170,352 A | 12/1992 | McTamaney et al. | |
| 5,321,614 A | 6/1994 | Ashworth | |
| 5,517,419 A | 5/1996 | Lanckton et al. | |
| 5,525,882 A | 6/1996 | Asaka et al. | |
| 5,525,883 A | 6/1996 | Avitzour | |
| 5,581,629 A | 12/1996 | Hanna et al. | |
| 5,677,836 A * | 10/1997 | Bauer ............... A47L 11/40011 701/23 | |
| 5,793,934 A | 8/1998 | Bauer | |
| 5,911,767 A | 6/1999 | Garibotto et al. | |
| 5,957,984 A | 9/1999 | Rencken | |
| 5,961,571 A | 10/1999 | Gorr et al. | |
| 6,005,610 A | 12/1999 | Pingali | |
| 6,009,359 A | 12/1999 | El-Hakim et al. | |
| 6,108,597 A | 8/2000 | Kirchner et al. | |
| 6,243,657 B1 | 6/2001 | Tuck et al. | |
| 6,256,581 B1 | 7/2001 | Fujii et al. | |
| 6,266,068 B1 | 7/2001 | Kang et al. | |
| 6,269,763 B1 | 8/2001 | Woodland | |
| 6,285,393 B1 | 9/2001 | Shimoura et al. | |
| 6,288,704 B1 | 9/2001 | Flack et al. | |
| 6,299,699 B1 * | 10/2001 | Porat ..................... E04H 4/1654 134/6 | |
| 6,301,370 B1 | 10/2001 | Steffens et al. | |
| 6,330,858 B1 | 12/2001 | McDonough et al. | |
| 6,427,118 B1 | 7/2002 | Suzuki | |
| 6,453,223 B1 | 9/2002 | Kelly et al. | |
| 6,459,955 B1 | 10/2002 | Bartsch et al. | |
| 6,463,368 B1 * | 10/2002 | Feiten ................... G05D 1/0227 701/23 | |
| 6,496,754 B2 | 12/2002 | Song et al. | |
| 6,516,267 B1 * | 2/2003 | Cherveny ............... G01C 21/26 123/399 | |
| 6,552,729 B1 | 4/2003 | Di Bernardo et al. | |
| 6,711,293 B1 | 3/2004 | Lowe | |
| 6,728,635 B2 | 4/2004 | Hamada et al. | |
| 6,742,613 B2 | 6/2004 | Erlich et al. | |
| 6,766,245 B2 | 7/2004 | Padmanabhan | |
| 6,771,932 B2 | 8/2004 | Caminiti et al. | |
| 6,836,701 B2 | 12/2004 | McKee | |
| 6,856,901 B2 | 2/2005 | Han | |
| 6,898,518 B2 | 5/2005 | Padmanabhan | |
| 6,904,360 B2 | 6/2005 | Pechatnikov et al. | |
| 6,915,008 B2 | 7/2005 | Barman et al. | |
| 6,917,855 B2 | 7/2005 | Gonzalez-Banos et al. | |
| 6,922,632 B2 * | 7/2005 | Foxlin ................... G01C 21/16 342/357.31 | |
| 7,015,831 B2 | 3/2006 | Karlsson et al. | |
| 7,031,496 B2 | 4/2006 | Shimano et al. | |
| 7,082,350 B2 | 7/2006 | Skoog | |
| 7,135,992 B2 | 11/2006 | Karlsson et al. | |
| 7,145,478 B2 | 12/2006 | Goncalves et al. | |
| 7,162,056 B2 | 1/2007 | Burl et al. | |
| 7,162,338 B2 | 1/2007 | Goncalves et al. | |
| 7,177,737 B2 | 2/2007 | Karlsson et al. | |
| 7,211,980 B1 * | 5/2007 | Bruemmer ........... G05D 1/0214 318/567 | |
| 7,225,552 B2 | 6/2007 | Kwon et al. | |
| 7,272,467 B2 | 9/2007 | Goncalves et al. | |
| 7,573,403 B2 | 8/2009 | Goncalves et al. | |
| 7,679,532 B2 | 3/2010 | Karlsson et al. | |
| 7,689,321 B2 | 3/2010 | Karlsson et al. | |
| 7,720,554 B2 | 5/2010 | DiBernardo et al. | |
| 7,774,158 B2 * | 8/2010 | Domingues Goncalves ............. G01C 21/12 701/26 | |
| 7,827,643 B2 | 11/2010 | Erlich et al. | |
| 7,912,633 B1 * | 3/2011 | Dietsch .................. G01C 21/20 701/450 | |
| 7,996,097 B2 | 8/2011 | DiBernardo et al. | |
| 8,086,419 B2 | 12/2011 | Goncalves et al. | |
| 8,095,336 B2 | 1/2012 | Goncalves et al. | |
| 8,150,650 B2 | 4/2012 | Goncalves et al. | |
| 8,274,406 B2 | 9/2012 | Karlsson et al. | |
| 8,295,955 B2 | 10/2012 | DiBernardo et al. | |
| 8,380,350 B2 | 2/2013 | Ozick et al. | |
| 8,396,592 B2 | 3/2013 | Jones et al. | |
| 8,412,377 B2 | 4/2013 | Casey et al. | |
| 8,428,778 B2 | 4/2013 | Landry et al. | |
| 8,452,450 B2 | 5/2013 | Dooley et al. | |
| 2002/0072848 A1 * | 6/2002 | Hamada ................. G01C 21/32 701/431 | |
| 2002/0095239 A1 | 7/2002 | Wallach et al. | |
| 2003/0007682 A1 | 1/2003 | Koshizen et al. | |
| 2003/0025472 A1 | 2/2003 | Jones et al. | |
| 2003/0030398 A1 | 2/2003 | Jacobs et al. | |
| 2003/0044048 A1 | 3/2003 | Zhang | |
| 2004/0122587 A1 | 6/2004 | Kanemitsu | |
| 2004/0167667 A1 | 8/2004 | Goncalves et al. | |
| 2004/0167669 A1 | 8/2004 | Karlsson et al. | |
| 2004/0167670 A1 * | 8/2004 | Goncalves ............. G01C 21/12 700/259 | |
| 2004/0167688 A1 * | 8/2004 | Karlsson ................ G01C 21/12 701/23 | |
| 2004/0167716 A1 | 8/2004 | Goncalves et al. | |
| 2004/0168148 A1 | 8/2004 | Goncalves et al. | |
| 2004/0249504 A1 | 12/2004 | Gutmann et al. | |
| 2005/0007057 A1 | 1/2005 | Peless et al. | |
| 2005/0010330 A1 | 1/2005 | Abramson et al. | |
| 2005/0182518 A1 * | 8/2005 | Karlsson ............... G05D 1/0246 700/253 | |
| 2005/0213082 A1 | 9/2005 | DiBernardo et al. | |
| 2005/0234679 A1 | 10/2005 | Karlsson et al. | |
| 2005/0238200 A1 | 10/2005 | Gupta et al. | |
| 2006/0012493 A1 * | 1/2006 | Karlsson ................ G01C 21/12 340/995.24 | |
| 2006/0027404 A1 * | 2/2006 | Foxlin ................... G01C 21/16 178/18.06 | |
| 2006/0293809 A1 | 12/2006 | Harwig et al. | |
| 2007/0045018 A1 | 3/2007 | Carter et al. | |
| 2007/0090973 A1 | 4/2007 | Karlsson et al. | |
| 2007/0156286 A1 | 7/2007 | Yamauchi | |
| 2007/0179670 A1 | 8/2007 | Chiappetta et al. | |
| 2007/0244610 A1 | 10/2007 | Ozick et al. | |
| 2007/0262884 A1 | 11/2007 | Goncalves et al. | |
| 2007/0271011 A1 | 11/2007 | Lee et al. | |
| 2007/0293985 A1 * | 12/2007 | Myeong ................ G05D 1/0246 700/245 | |
| 2008/0012518 A1 | 1/2008 | Yamamoto | |
| 2008/0155768 A1 | 7/2008 | Ziegler et al. | |
| 2008/0273791 A1 * | 11/2008 | Lee ..................... G06K 9/00771 382/153 | |
| 2008/0294338 A1 * | 11/2008 | Doh ..................... G05D 1/0234 701/533 | |
| 2009/0024251 A1 * | 1/2009 | Myeong ................ G05D 1/0246 700/259 | |
| 2009/0055020 A1 * | 2/2009 | Jeong ................... G05D 1/0246 700/251 | |
| 2009/0081923 A1 | 3/2009 | Dooley et al. | |
| 2009/0093907 A1 * | 4/2009 | Masaki ................... G05D 1/024 700/248 | |
| 2009/0281661 A1 | 11/2009 | Dooley et al. | |
| 2010/0020093 A1 | 1/2010 | Stroila et al. | |
| 2010/0040279 A1 * | 2/2010 | Yoon ..................... G05D 1/0251 |

(56) References Cited

U.S. PATENT DOCUMENTS

| | | | |
|---|---|---|---|
| 2010/0049391 A1* | 2/2010 | Nakano | G05D 1/024 382/153 701/23 |
| 2010/0070078 A1* | 3/2010 | Kong | G05D 1/0274 700/259 |
| 2010/0198443 A1 | 8/2010 | Yabushita et al. | |
| 2010/0235033 A1 | 9/2010 | Yamamoto et al. | |
| 2010/0241289 A1 | 9/2010 | Sandberg | |
| 2010/0280754 A1 | 11/2010 | Goncalves et al. | |
| 2010/0284621 A1 | 11/2010 | Goncalves et al. | |
| 2010/0286905 A1 | 11/2010 | Goncalves et al. | |
| 2011/0010033 A1* | 1/2011 | Asahara | G05D 1/024 701/26 |
| 2011/0082585 A1* | 4/2011 | Sofman | G05D 1/0274 700/259 |
| 2011/0125323 A1 | 5/2011 | Gutmann et al. | |
| 2011/0167574 A1* | 7/2011 | Stout | G05D 1/0219 15/3 |
| 2011/0178668 A1* | 7/2011 | Tanaka | G09B 29/106 701/25 |
| 2011/0208745 A1* | 8/2011 | Dietsch | G01C 21/20 707/743 |
| 2012/0022785 A1 | 1/2012 | DiBernardo et al. | |
| 2012/0029698 A1* | 2/2012 | Myeong | G05D 1/0272 700/253 |
| 2012/0089295 A1* | 4/2012 | Ahn | G05D 1/0242 701/28 |
| 2012/0106828 A1* | 5/2012 | Yoon | G06K 9/00664 382/153 |
| 2012/0121161 A1 | 5/2012 | Eade et al. | |
| 2012/0213443 A1* | 8/2012 | Shin | G05D 1/0246 382/190 |
| 2012/0219207 A1 | 8/2012 | Shin et al. | |
| 2012/0230550 A1* | 9/2012 | Kraut | G05D 1/024 382/113 |
| 2012/0232795 A1* | 9/2012 | Robertson | G01C 22/006 701/532 |
| 2013/0060382 A1* | 3/2013 | Pitzer | G06N 7/005 700/258 |
| 2013/0096885 A1* | 4/2013 | Gupta | G01C 21/206 703/1 |
| 2013/0216098 A1* | 8/2013 | Hasegawa | G05D 1/0274 382/103 |
| 2013/0245937 A1 | 9/2013 | DiBernardo et al. | |
| 2014/0005933 A1* | 1/2014 | Fong | G05D 1/0274 701/447 |
| 2015/0350378 A1* | 12/2015 | Hertel | H04L 67/42 709/203 |
| 2016/0005229 A1* | 1/2016 | Lee | G06T 19/003 345/419 |

FOREIGN PATENT DOCUMENTS

| | | |
|---|---|---|
| JP | 2003-166824 A | 6/2003 |
| JP | 2004-199389 A | 7/2004 |
| JP | 2007-525765 A | 9/2007 |
| JP | 2008-032478 A | 2/2008 |
| JP | 2010-108483 A | 5/2010 |
| JP | 2011-039969 A | 2/2011 |
| JP | 2011-108084 A | 6/2011 |
| WO | WO 2011/052827 A1 | 5/2011 |

OTHER PUBLICATIONS

Adam et al.; Fusion of Fixation and Odemetry for Vehicle Navigation; (1999); IEEE; 29(6): 593-603.

Agrawal et al., CenSurE: Center Surround Extremas for Realtime Feature Detection and Matching, Lecture Notes in Computer Science, Computer Vision—ECCV (2008), 5305: 102-115.

Bay et al., Speeded-up Robust Features (SURF). Computer Vision and Image Understanding, (2008), 110(3) : 346-359 [Available Online Dec. 15, 2007].

Castellanos et al., Multisensor Fusion for Simultaneous Localization and Map Building; (2001); IEEE; 17(6): 908-914.

Castle et al., Video-rate localization in multiple maps for wearable augmented reality. In Proc 12th IEEE Int Symp on Wearable Computers (2008), Pittsburgh PA, Sep. 28-Oct. 1, 2008, pp. 15-22.

Circirelli, et al.; Position Estimation for a Mobile Robot using Data Fusion; Intelligent Control, IEEE, May 1995, pp. 565-570.

Davison et al., Monoslam: Real-time single camera slam. IEEE Trans. Pattern Anal. Mach. Intell., (2007), 29(6): 1052-1067.

Davison., Real-time simultaneous localisation and mapping with a single camera. In Proc. 9th IEEE International Conference on Computer Vision (ICCV'03), Nice, France, (Oct. 2003), pp. 1403-1410.

Digiclops, versatile digital camera [online], [retrieved on Sep. 23, 2003]. Point Grey Research. Retrieved from the Internet: <URL: http://www.ptgrey.com/products/digiclops/digiclops.pdf>.

Dissanayake, et al., *A Computationally Efficient Solution to the Simultaneous Localisation and Map Building (SLAM) Problem*, Proceedings of the 2000 IEEE international Conference on Robotics & Automation (ICRA) Apr. 2000, pp. 1009-1014.

Eade et al., Monocular Slam as a graph of coalesced observations. In Proc.11th IEEE International Conference on Computer Vision (ICCV'07), Rio de Janeiro, Brazil, (Oct. 2007), pp. 1-8.

Eade et al., Unified Loop Closing and Recovery for Real Time Monocular Slam. In Proc. British Machine Vision Conference (BM VC '08), Leeds, BMVA, (Sep. 2008), pp. 53-62.

Faugeras, et al., Chapter 8, "Three Views: The trifocal geometry" in *The Geometry of Multiple Images*, (Cambridge, The MIT Press, 2001), pp. 409-500.

Fischler et al., Random sample consensus; A paradigm for model fitting with applications to image analysis and automated cartography. Communications of the ACM, (Jun. 1981), 24(6): 381-395.

Fox, et al., "Particle Filters for Mobile Robot Localization" in: Doucet, A., Freitas, N., and Gordon, N., *Sequential Monte Carlo Methods in Practice* (New York, Springer Verlag, 2001), pp. 401-428.

Fox. et al., "Markov Localization for mobile robots in dynamic environments" *Journal of Artificial Intelligence Research*, vol. 11 (1999), pp. 391-427.

Gaspar, et al.; Vision-Based Navigation and Environmental Representation with an Omnidirectional Camera; 2000; IEEE; pp. 890-898.

Goncalves et al., A visual frontend for simultaneous localization and mapping. In Proc. of Int. Conf. on Robotics and Automation (ICRA), Barcelona, Spain, (Apr. 2005), pp. 44-49.

Grisetti et al., Online Constraint Network Optimization for Efficient Maximum Likelihood Map Learning. Robotics and Automation IEEE Conference (ICRA), Pasadena, California, (May 2008), pp. 1880-1885.

Ila et al., Vision-based Loop Closing for Delayed State Robot Mapping, Proceedings of the 2007 IEEE/RSJ International, San Diego, CA (Oct. 2007), pp. 3892-3897.

International Search Report and Written Opinion dated Jan. 19, 2012 for PCT application PCT/US2011/053122, filed Sep. 23, 2011.

International Search Report dated Jun. 30, 2004 for PCT application PCT/US03/39996, filed Dec. 17, 2003.

Johannes Strom et al. "Occupancy Grid Rasterization in Large Environments for Teams of Robots," 2011 IEEE/RSJ Intl Conf. on Int. Robots and Systems, Sep. 2011 pp. 4271-4276.

Kalman, R.E., "A New Approach to Linear Filtering and Prediction Problems" *Transactions of the ASME—Journal of Basic Engineering*, vol. 82D, (1960) pp. 35-45.

Karlsson et al., The vSLAM Algorithm for Robust Localization and Mapping, Proc of Int Conf on Robotics & Automation (ICRA), (2005) [Online: http://ieeexplore.ieee.org/xpl/freeabs_all.jsp?arnumber=1570091].

Klein et al., Parallel tracking and mapping for small AR workspaces. In Proc. 6thh IEEE and ACM Int'l Symp. Mixed and Augmented Reality, (2007) pp. 1-10.

Konolige et al., Frame-frame matching for realtime consistent visual mapping. In Proc. 2007 IEEE International Conference on Robotics and Automation (ICRA '07), Rome, Italy, (Apr. 2007) pp. 2803-2810.

Konolige, K., SLAM via Variable Reduction from Constraint Maps. Proceedings of the 2005 IEEE International Conference, Barcelona, Spain, In ICRA, Robotics and Automation (Apr. 2005) pp. 667-672.

(56) References Cited

OTHER PUBLICATIONS

Konolige, K., View-based maps. In Proceedings of Robotics: Science and Systems, Seattle, USA, (Jun. 2009), pp. 1-14.
Kretzschmar et al., Lifelong Map Learning for Graph-based SLAM in Static Environments. KI-Künstliche Intelligenz, (May 2010) 24(3), 199-206.
Lowe D. G., Distinctive image features from scale-invariant keypoints, International Journal of Computer Vision, (2004), 60(2): 91-100.
Lowe, D.G., "Local Feature View Clustering for 3D Object Recognition" Proceedings of the IEEE Conference on Computer Vision and Pattern Recognition, Kauai, Hawaii (Dec. 2001), pp. 682-688 (pp. 1-7).
Lowe, David G., "Object Recognition from Local Scale-Invariant Features" *Proceedings of the International Conference on Computer Vision*, Corfu, Greece (Sep. 1999), pp. 1150-1157 (pp. 1-8).
Matas et al., Robust wide baseline stereo from maximally stable extremal regions. In Proc. British Machine Vision Conference (BMVC '02), Cardiff, (Sep. 2002) pp. 384-393.
Mikolajcyk et al., A performance evaluation of local descriptors. IEEE Transactions on Pattern Analysis and Machine Intelligence (PAMI), (2005), 27(10): 1615-1630.
Montemerlo et al., FastSLAM 2.0: An Improved Particle Filtering Algorithm for Simultaneous Localization and Mapping that Provably Converges., Proc. 18th International Joint Conference on Artificial Intelligence (IJCAI'03), Acapulco, Mexico, (Aug. 2003) pp. 1-6.
Montemerlo et al., FastSLAM: A Factored Solution to the Simultaneous Localization and Mapping Problem, Proceedings of the American Association for Artificial Intelligence (AAAI) National Conference on Artifical Intelligence, Edmonton, Canada (2002), pp. 1-6.
Nagao, Katashi, et al.; *Social Annotation to Indoor 3D Maps Generated Automatically*; 2012 Information Processing Society of Japan; 9 pp.
Nister et al., Scalable recognition with a vocabulary tree. In Proc. IEEE Intl. Conference on Computer Vision and Pattern Recognition (CVPR '06), pp. 2161-2168, New York, NY, USA, . IEEE Computer Society (Jun. 2006), pp. 2161-2168.
Nister, D., An Efficient Solution to the Five-Point Relative Pose Problem. IEEE Trans Pattern Anal Mach Intel. (PAMI), (Jun. 2004), 26(6): 756-777.
Office Action, Japanese Patent Office, Patent Application No. 2015-517500, mailing date of Oct. 27, 2015; 3 pp; together with translation 3 pp.
Roumeliotis, et al., "Bayesian estimation and Kalman filtering: A unified framework for mobile robot localization" *Proceedings of the IEEE International Conference on Robotics and Automation* (ICRA), San Francisco, CA (2000) pp. 2985-2992.
Se, et al., "Local and Global Localization for Mobile Robots using Visual Landmarks" *Proceedings of the 2001 IEEE/RSJ International Conference on Intelligent Robots and Systems, Maui, Hawaii*, (2001) pp. 414-420.
Se, et al., "Mobile Robot Localization and Mapping with Uncertainty using Scale-Invariant Visual Landmarks" *The International Journal of Robotics Research*, vol. 21, No. 8, (Sage Publications Aug. 2002), pp. 735-758.
Se, et al., "Vision-based Mobile Robot Localization and Mapping using Scale-Invariant Features" *Proceedings of IEEE International Conference on Robotics and Automation*, Seoul, Korea, May 2001 (ICRA 2001), pp. 2051-2058.
Shewchuk, J. R., An Introduction to the Conjugate Gradient Method without the agonizing pain. Technical report, Pittsburgh, PA, USA, (1994) pp. 1-64.
Sivic et al., Video Google: A text retrieval approach to object matching in videos. In Proc. 9th IEEE International Conference on Computer Vision (ICCV'03), Nice, France, (Oct. 2003), pp. 1470-1477.
Stella, et al., *Position Estimation for a Mobile Robot using Data Fusion*. Intelligent Control, IEEE, May, 1995, pp. 565-570.
Supplementary Partial European Search Report, dated Oct. 23, 2015, EP Application No. 13843954, 4 pp.
Thrun et al., Multi-Robot Slam WITH Sparce Extended Information Filers, Robotics Research, Springer Tracts in Advanced Robotics, (2005) 15: 1-12. [Online: http://springerlink.com/content/255jw4Inhhwg6k1I].
Thrun et al., The GraphSLAM Algorithm with Applications to Large-scale Mapping of Urban Structures. International Journal on Robotics Research, (2005) 25(5/6): 403-430.
Thrun, et al., "A Probabilistic Approach to Concurrent Mapping and Localization for Mobile Robots" *Machine Learning*, vol. 31, No. 1-3 (1998) pp. 29-53.
Thrun, S. "Probabilistic Algorithms in Robotics" Technical Report, CMU-CS-00-126, Carnegie Mellon University, Pittsburgh, PA, (Apr. 2000), pp. 1-18.
Thrun, S. "Robotic Mapping: A Survey" Technical Report, CMU-CS-02-111, Carnegie Mellon University, Pittsburgh, PA (Feb. 2000) pp. 1-29.
Triggs et al., Bundle adjustment—A Modern Synthesis, in B. Triggs, A. Zisserman, and R. Szeliski, editors, Vision Algorithms: Theory and Practice, Lecture Notes in Computer Science, (2000) 1883: 298-372.
Williams et al., An image-to-map loop closing method for monocular slam. In Proc. 2007 IEEE Int. Conf. Intelligent Robots and Systems, (2008) pp. 1-7.
Wolf, et al., "Robust Vision-based Localization for Mobile Robots Using an Image Retrieval System Based on Invariant Features" *Proceedings of the 2002 IEEE International Conference on Robotics and Automation*, Washington, DC, (May 2002) pp. 359-363.
Canadian Office Action dated Jan. 11, 2016 regarding Application No. 2,870,381, PCT No. US 2013061208, entitled "Adaptive Mapping with Spatial Summaries of Sensor Data," 5 pages.

* cited by examiner

ADAPTIVE MAPPING WITH SPATIAL SUMMARIES OF SENSOR DATA

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

1. Field of the Invention

The invention relates to a technique for generating a map of an environment using a plurality of sub-maps. In particular, the invention relates to a system and method for combining sensor data into a plurality of sub-maps based upon the location of the sensor when the data was acquired and the certainty with its location was known.

2. Description of the Related Art

In the past few years, a substantial research effort has been devoted to the problem of Simultaneous Localization and Mapping (SLAM). The term "map" in the field of SLAM generally refers to a spatial arrangement of observed landmarks or features. If these landmarks correspond to obstacle locations (such as the measurements collected with a Laser Range Finder), then the "map" yields an occupancy map denoting the floor plan of the space in which the robot is operating. In other cases, in which the landmark information does not correspond to obstacle locations (such as the measurements taken with a camera), the "map" estimated with SLAM techniques is dissociated from the locations of obstacles (occupancy map). However, an occupancy map is required for the robot to properly make decisions and navigate the environment.

A number of SLAM techniques have been proposed for simultaneously estimating the poses (i.e. localization) and building the map. Some methods re-estimate past poses instead of only the latest pose as new information is collected, achieving an improvement in the estimate of the robot trajectory as the localization system is updated. Laser scans, for example, are collected as a mobile robot moves through an indoor environment. These scans are combined with odometry information to estimate the robot's trajectory to yield a map showing the floor plan of the building. As more information is collected, the accuracy of the map improves because the estimates of the past poses of the robot are improved. A disadvantage of this system is that all sensor readings and their associated poses must be stored to allow the sensor data to be re-processed when new information arrives. This results in storage requirements that grow linearly with time. There is therefore a need for a localization and mapping technique that efficiently creates an occupancy map using new information to improve accuracy of the map without the storage requirement growing linearly with time.

SUMMARY OF THE INVENTION

The invention in the preferred embodiment features a system and method for mapping parameter data acquired by a robot or other mapping system that travels through an environment. The method generally comprises: measuring parameters that characterize the environment while driving the robot through the environment; generating estimates of the current robot pose, mapping parameter data to a current grid associated with an anchor node until the estimated pose uncertainty between with the current pose and the prior anchor node exceeds a threshold. When the threshold is exceeded, the robot generates a new grid associated with a new anchor node to record parameter data. The robot repeatedly generates new grids associated with different anchor nodes for purpose of recording parameter data. The estimated positions of the anchor nodes are updated over time as the robot refines its estimates of the locations of landmarks from which it estimates its position in the environment. When an occupancy map or other global parameter map is required, the robot merges local grids into a comprehensive map indicating the parameter data in a global reference frame.

In accordance with some embodiments of the invention, the robot may map new parameter data to a new local parameter grid or to a pre-existing parameter grid. Data is recorded to a pre-existing parameter grid if the uncertainty between the current robot pose estimate and the pose estimate associated with the pre-existing grid is below a predetermined threshold. By using pre-existing grids, the robot can limit the memory requirements necessary to map the environment without the memory requirements growing linearly in time.

BRIEF DESCRIPTION OF THE DRAWINGS

The present invention is illustrated by way of example and not limitation in the figures of the accompanying drawings, and in which.

DETAILED DESCRIPTION OF THE PREFERRED EMBODIMENT

Figure 1:
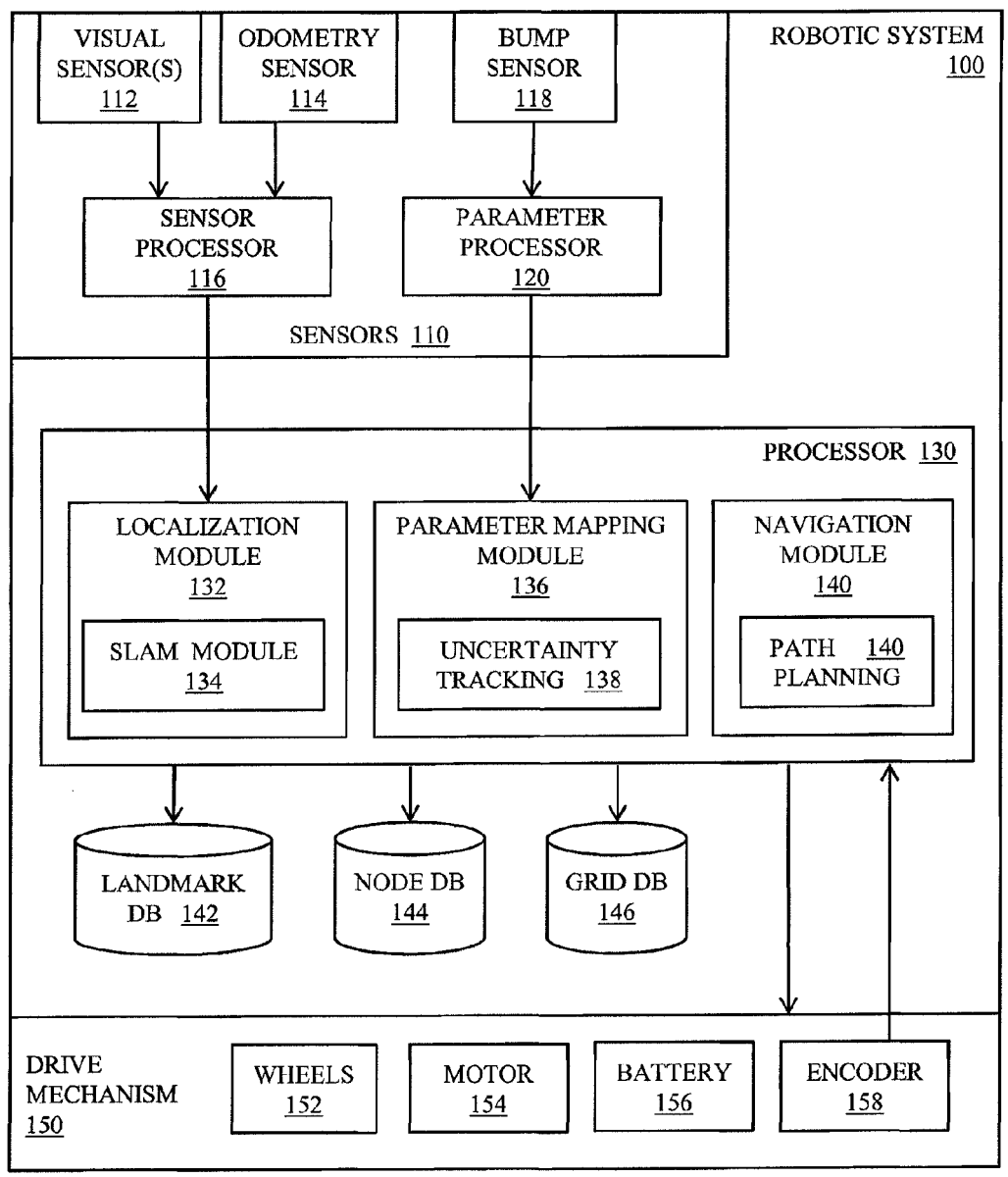
FIG. 1 is a functional block diagram of a robotic system, in accordance with the preferred embodiment of the present invention.

Illustrated in FIG. 1 is a functional block diagram of a mobile robotic system configured to generate spatial summaries as described in more detail below. The robotic system 100 includes one or more sensors 110, a central processing unit 130, one or more databases for storing relevant data, and a drive mechanism 150 including drive wheels 152, for example. The one or more sensors 110 include one or more visual sensors 112, i.e., cameras, video cameras, imagers including CCD imagers, CMOS imagers, and infrared imagers, for example, for acquiring images of the environment in which the robot is roving. The set of sensors in the preferred embodiment also includes one or more wheel odometers 158 for measuring the rotation of the wheels of the drive system. The set of sensors may further include one or more bump sensors 118 for generating a signal indicating the presence of an obstacle in the path of the mobile robot.

Data from the sensors 112, 114 may undergo preprocessing at processing unit 116. For example, the processing unit 116 may extract visual features from the image data for purposes of recognizing known landmarks, and process odometry data to convert wheel encoder signals or other odometry data to distance and rotation estimates. In some embodiments, odometry data may be used to detect and compensate for situations in which the drive wheels slip due to wet, slick, or carpeted surfaces. Data from the bump sensor 118 may undergo preprocessing at the processing unit 120 to determine when the robot encounters and obstacle as well as the position of the obstacle with respect to the robot path.

In other embodiments, the set of sensors 110 includes range finders, including laser, infrared (IR), and acoustic range finders; proximity sensors including lateral proximity sensors for determining lateral distance to objects in the environment; drop sensors for detecting staircases and other locations that are unsuitable for travel by the robot; and floor surface sensors, including sensors for measuring dirt concentration, slippage, and soil characteristics.

The mobile robot system 100 further includes at least one processor 130 configured to perform localization, generate maps of properties characterizing the environment in which the robot is operating, and navigate through the environment. In the preferred embodiment, the localization module 132 determines the location of landmarks as well as the mobile robot with visual and odometry data using a technique called Simultaneous Localization and Mapping (SLAM) 134 taught in U.S. Pat. No. 7,135,992 hereby incorporated by reference herein. Using this technique, the robotic system explores its environment, takes numerous images of its environment, makes a map depicting landmarks in the environment, and estimates the location of the robot relative to those landmarks. In the preferred embodiment, landmarks are visually identified using visual features from the image data are extracted and matched using a Scale Invariant Feature Transform (SIFT), Speeded Up Robust Features (SURF), Gradient Location and Orientation Histogram (GLOH), Binary Robust Independent Elementary Features (BRIEF), or other type of visual feature known to those skilled in the art. The visual landmarks—along with estimates of the robot position and orientation (pose) of the robot when the image was taken—are stored in the landmark database 142.

The parameter mapping module 136 is configured to generate a plurality of sub-maps or grids comprising local parameters and build global parameter maps based on those grids. In particular, the module 136 builds grids that depict the properties of the environment in proximity to associated anchor nodes, i.e., reference points fixed in their respective local reference frames. Estimates of the locations of the anchor nodes within the global reference frame are continually updated as the SLAM module 134 refines the localization map characterizing the environment. In the preferred embodiment, the parameters being mapped by the mapping module 136 include obstacles and clear spaces through which the robot system is free to navigate, as is explained in more detail below. Each of the anchor nodes is stored in node database 144 and the associated grid stored in the grid database 146. In the preferred embodiment, the mapping module includes an uncertainty tracking module 138 for measuring the uncertainty associated with the anchor nodes' localization estimate which is stored together with the anchor nodes' coordinates and heading in the global reference frame.

The processor 130 in the preferred embodiment further includes a navigation module 140 configured to generate signals that control the movement of the robot. For example, the navigation module can provide control signals to instruct the robot to move forward, to stop, to move backward, to turn, to rotate about a vertical axis. If the mobile robot system is an autonomous or semi-autonomous robot, the navigation module 140 can also perform path planning to efficiently guide the robot system to a desired destination and/or to achieve a desired goal. In accordance with the preferred embodiment, path planning is based on a parameter map that is generated from a plurality of parameter grids using current estimates of the poses of the anchors nodes corresponding to those grids.

The robot system 100 further includes a drive mechanism 150 for moving the robot around its environment, which may be indoors, outdoors, or a combination thereof. In the preferred embodiment, the drive mechanism includes two or more wheels drive wheels 152 powers by a motor 154 and battery pack 156, for example. In addition to, or instead of, the robot system may also incorporate other forms of locomotion including tracks, rollers, propellers, legs, and the like, to move around. The drive system may further include one or more optical wheel encoders 158, for example, for measuring the wheel rotation and estimating the distance traveled by the robot system. In addition, the difference in the rotation of opposing wheels can indicate changes in heading.

With wheel encoders 158 or other type of dead reckoning, the robot system can compute course and distance traveled from a previous position and orientation (pose) and use this information to estimate a current (pose). While relatively accurate over relatively short distances, dead reckoning sensing is prone to drift over time. Other forms of dead reckoning can include a pedometer (for walking robots), measurements from an inertial measurement unit, optical sensors such as those used in optical mouse devices, and the like.

Figure 2A:
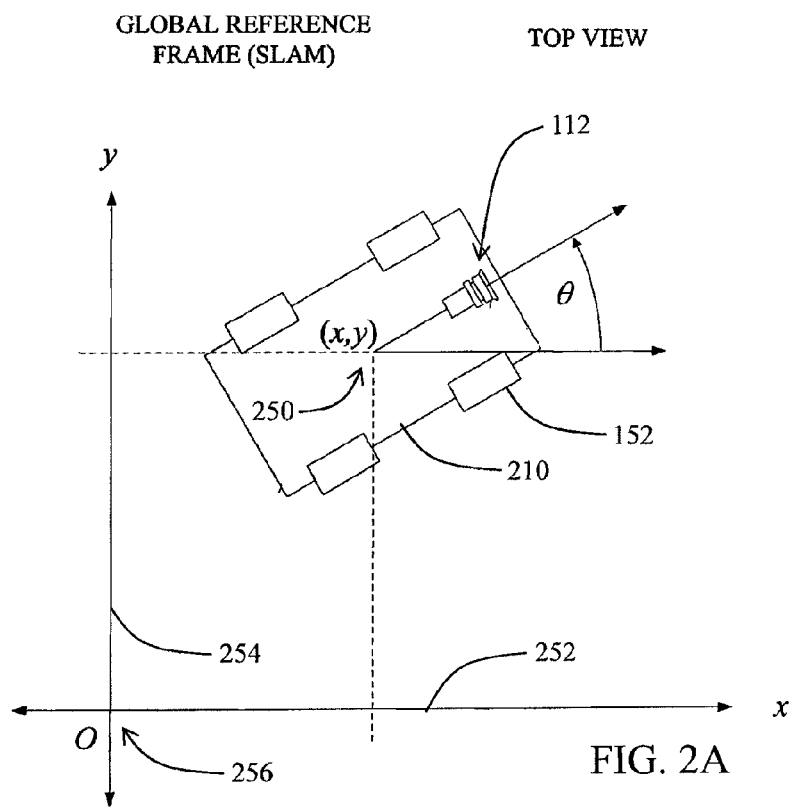
FIG. 2A is a diagrammatic illustration of the of a mobile robotic system in a global reference frame, in accordance with the preferred embodiment of the present invention.

In the preferred embodiment, the robot system 210 tracks its current location, path, or combination thereof with respect to a global reference frame represented by Cartesian (x-y) coordinates 250, as shown in FIG. 2. It will be understood that other coordinate systems, such as polar coordinates, can also be used. With respect to FIG. 2, a horizontal axis 252 corresponds to the x-axis and a vertical axis 254 corresponds to the y-axis. The origin 256 of the coordinate system may coincide with the robot's starting position, position or a prior anchor node, or other arbitrary location. The pose, including position and orientation, of the robotic system may be recorded in terms of the Cartesian coordinates and angle theta, $\theta$.

Figure 2B:
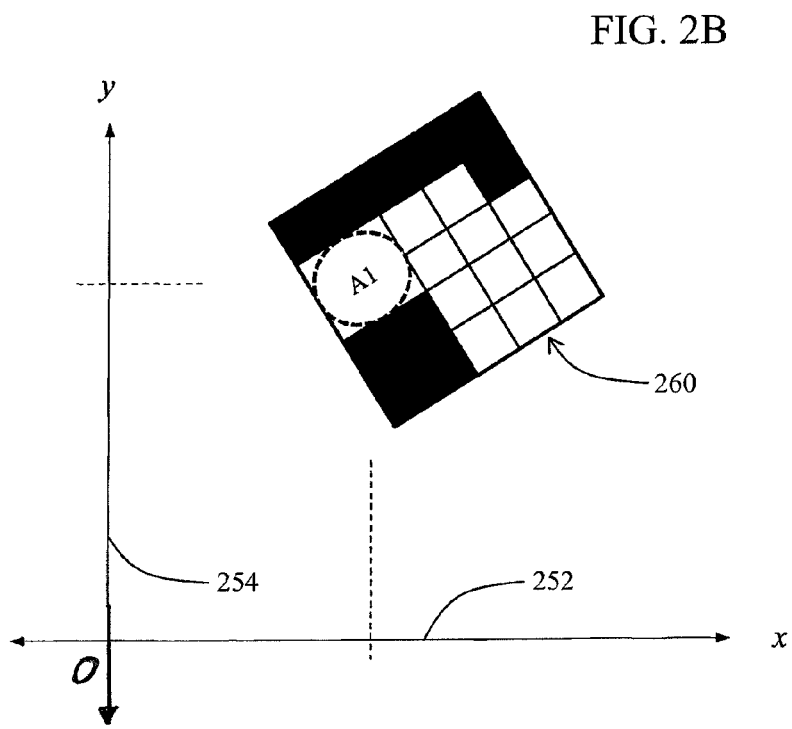
FIG. 2B is a diagrammatic illustration of a local grid at a location coinciding with an anchor node in the global reference frame, in accordance with the preferred embodiment of the present invention.

By contrast, a grid in the preferred embodiment includes a map of local parameter data located relative to an anchor node in a local reference frame. As shown in FIG. 2B, properties of the environment in proximity to the anchor node are mapped to the grid 260 relative to the position of the anchor node A1. The grid 260 is therefore a local map describing the environment in the region around the anchor node. In the preferred embodiment, each grid includes a two dimensional Cartesian representation depicting the locations of obstacles (black cells) detect by the bump sensor 118 and open spaces (white cells) traversed by the robot (not to scale). In the preferred embodiment, an axis of the grid's Cartesian coordinate system coincides with robot's orientation anchor node, θ, which is generally different than the orientation of the x-axis 252 and y-axis 254 in the global reference frame. With respect to the global reference frame, an anchor node is typically a point along the path of the robot while navigating through the environment.

Although the grids in the preferred embodiment are shown as two dimensional (2D) Cartesian sub-maps, the grids may effectively record local parameter data using other reference systems including spherical and cylindrical coordinates systems for example. The parameter data is represented with pixels in a Cartesian coordinate system in the preferred embodiment. In alternative embodiments, grids may represent local parameter data as (1) pixels in a cylindrical coordinate system, (2) polygons with an arbitrary number of sides, or (3) other arbitrary shape, for example.

Figure 3A:
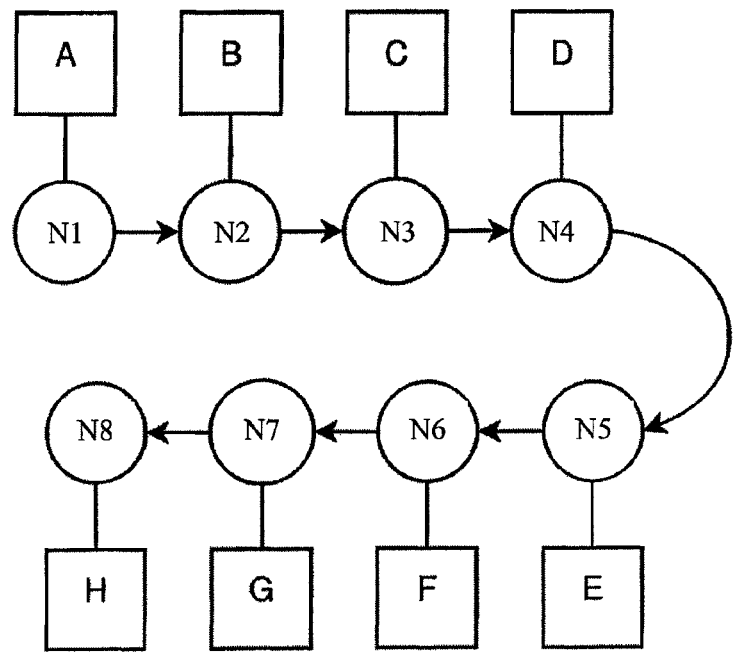
FIG. 3A is a robot trajectory showing nodes and corresponding sensor data, in accordance with the preferred embodiment of the present invention.

Referring to FIG. 3A, the robotic system 100 in the exemplary embodiment is configured to traverses a path through an environment. The path may be predetermined by the navigation module, determined ad hoc, or manually determined by a human driver or navigator, for example. While traversing the path, the localization module acquires image data with which it generates new landmarks and recognizes known landmarks for purposes of mapping the environment and locating the robotic system within the environment. The landmark information, in combination with the odometry information, enables the robotic system to make accurate estimates of the robot's location in the environment.

Figure 3B:
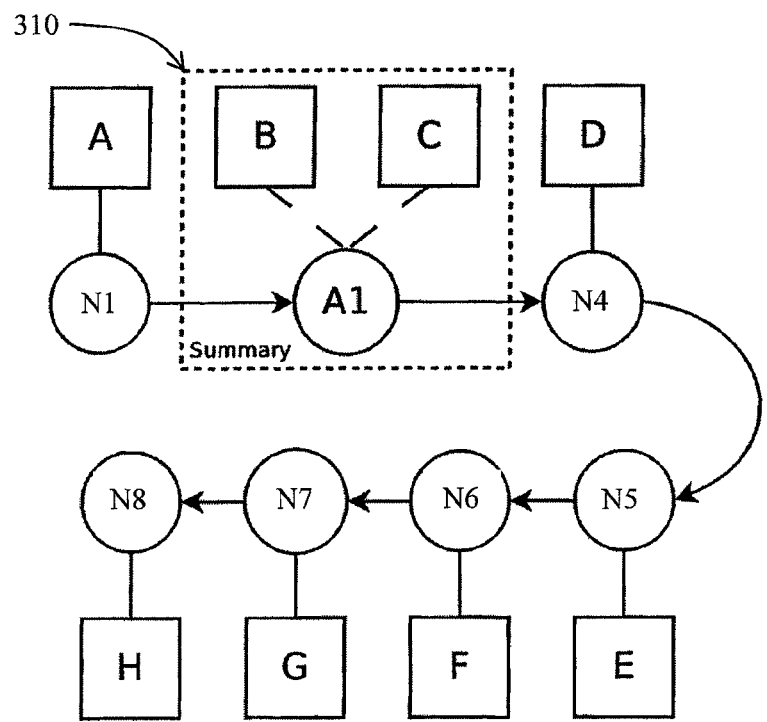
FIG. 3B is a robot trajectory showing an anchor node and summary of sensor data, in accordance with the preferred embodiment of the present invention.

The robotic system generates a map of one or more parameters of interest in parallel with the location determination. In particular, the parameter mapping module senses properties of the environment and generates a parameter map depicting those properties. Referring to FIG. 3A, the mapping process begins by taking measurements of these properties and various locations or poses in the environment. The robot poses are represented as circles N1-N8 and the parameters observed at each of the respective poses is poses are represented as squares A-H. As one skilled in the art will appreciate, the parameter data would generally grow linearly in time as the robot continues to collect measurements. To limit the parameter to a manageable level, the robotic system in the present invention generates spatial summaries that effectively summarize parameter data is specific geographic locations. Referring to FIG. 3B, the robot system is configured to combine parameter readings for different poses if the relative uncertainty between those poses is small. For example, if Pose 1 and Pose 2 in FIG. 3A have a relative pose transformation with low uncertainty, Sensor Data B and C can be combined into one summary corresponding to Pose A1 shown in FIG. 3B. The pose associated with the summary of Sensor Data B and C is tied to one root poses referred to herein as an anchor node. The pose selected to be the anchor node may be the pose associated with Pose 2, Pose 3, or a new pose created from the combination of the Pose 2 and 3.

Figure 3C:
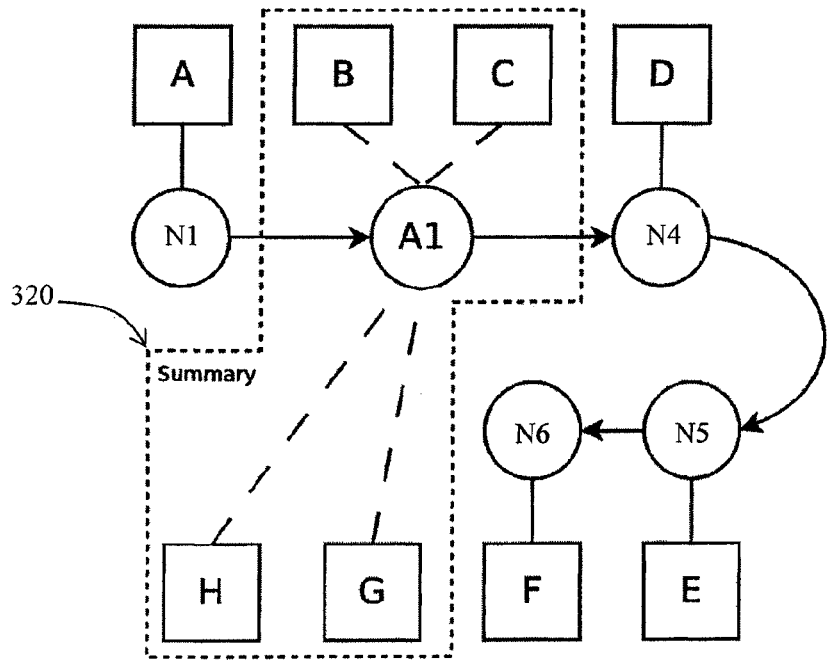
FIG. 3C is a robot trajectory showing an anchor node and summary of sensor data, in accordance with the preferred embodiment of the present invention.
Figure 4:
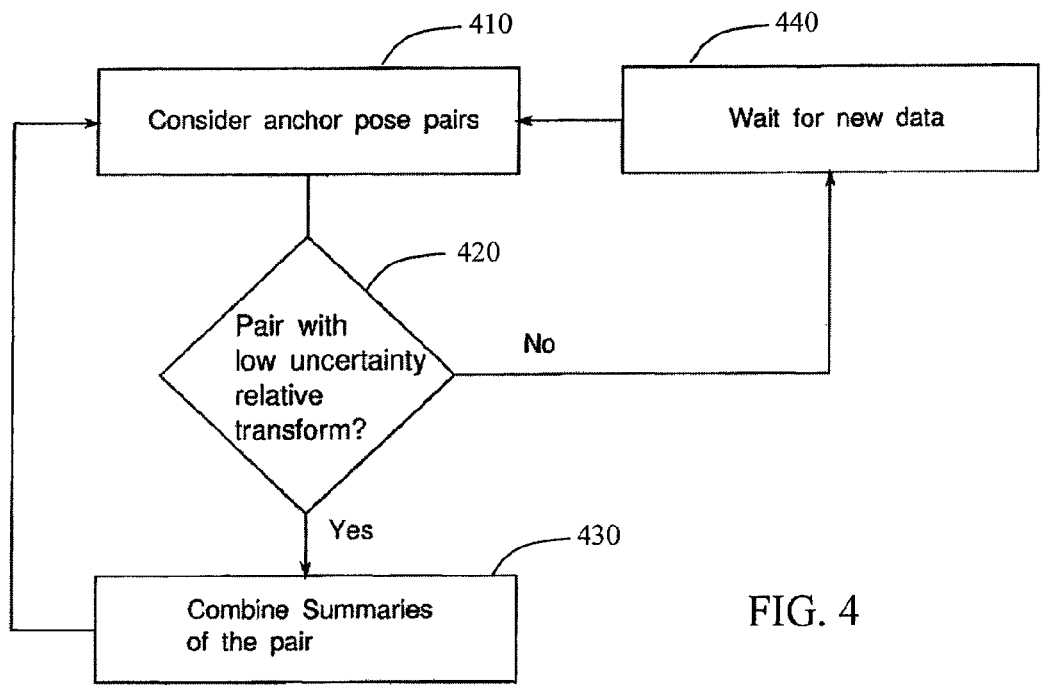
FIG. 4 is a flowchart showing process of summarizing sensor data, in accordance with the preferred embodiment of the present invention.

Successive poses, like Pose 2 and Pose 3, generally have a relatively low relative uncertainty (due to the accuracy of the dead reckoning sensors) and may, therefore be combined into a single summary in many cases. As the localization information generated by the location module improves over time, the uncertainty of the relative pose between anchor nodes of two summaries will decrease. When the relative pose between two anchor nodes becomes sufficiently certain—the relative uncertainty drops below a threshold—the summaries associated with multiple nodes may be combined into a single summary that is then associated with a single anchor node. As shown in FIG. 3C, the summary of Sensor Data B and C is combined with the summary of Sensor Data H and G to create a single new summary associated with the anchor node A1. Since the new summary effectively summarizes the sensor data in the region of Anchor A1, the summary including Sensor Data B, C, G, and H is referred to herein as a spatial summary. As illustrated in FIG. 4, multiple pairs of anchor node poses are compared. In the extreme, the pose for each anchor is compared to the pose for every other anchor node. If the uncertainty associated with the relative pose between the anchor nodes is below a threshold, the decision block is answered in the affirmative and the summaries (comprised of sensor data) for the anchor nodes are combined into a single summary associated with a single anchor node. If, however, the uncertainty exceeds the threshold, the pair of anchor nodes is not combined and new sensor data added to the grid associated with the current node. The "uncertainty" of relative poses between anchor nodes is, in the preferred embodiment, the sum of the diagonal elements of the covariance matrix of the relative pose estimate. In other embodiments, the method of measuring relative uncertainty includes generating a Mahalanobis distance, or like uncertainty estimating metric.

Figure 5A:
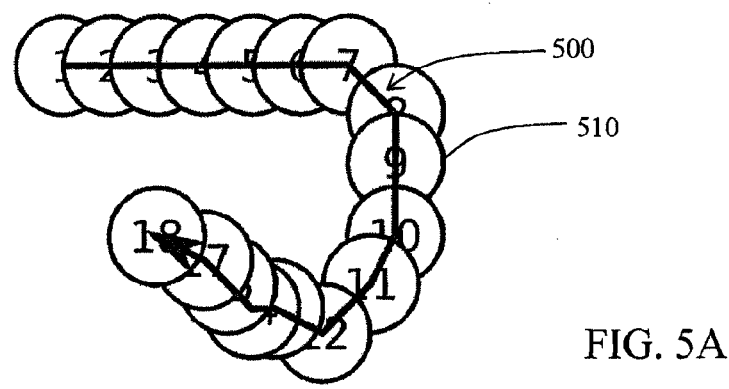
FIG. 5A is a robot trajectory showing nodes, in accordance with the preferred embodiment of the present invention.
Figure 5B:
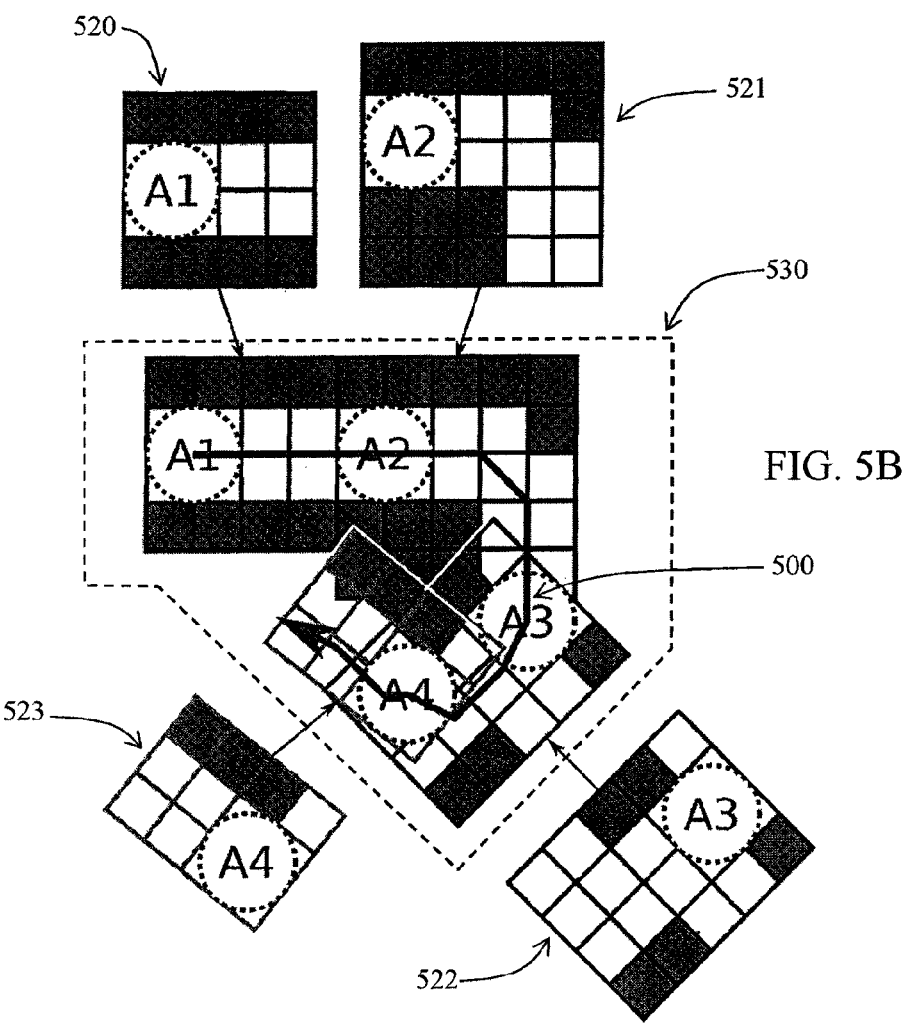
FIG. 5B shows a plurality of local parameter grids, in accordance with the preferred embodiment of the present invention.

As described above, the parameter data from a plurality of grids may be merged in a single summary associated with a single anchor nodes based on the relative pose uncertainty. Other criteria may also be used when determining whether to combine grids. These criteria may include, but are not limited to: (a) whether the summary reduces the memory requirements, i.e., whether the number of anchor nodes and grids data is reduced; (b) whether the summary improves performance, i.e., whether the summary reduces the time needed to compute a complete parameter map; (c) whether the map quality improves, i.e., whether merging or eliminating relatively "old" and outdated maps while retaining relatively "newer" maps improves the accuracy of the parameter map; or (d) any combination thereof Illustrated in FIG. 5A is a robot path 500 and a plurality of corresponding nodes 510, and illustrated in FIG. 5B are the anchor nodes and associated grids that summarize the sensor data for the nodes 510 shown in FIG. 5A. Referring to FIG. 5A, the robot system collects sensor data while traverse a trajectory 500 through the environment. The sensor data, including obstacles, for example are associated with the pose of the robot at the time the sensor data was taken. Due to the volume of this data, however, the robotic system summarizes this data in the manner illustrated in FIG. 5B. Anchor nodes A1-A4 are shown in FIG. 5B as circles and the grids 520-523 shown as rectangles. In the preferred embodiment, the sensor data includes bump sensor data that indicates the presence of obstacles. Each grid, thus, depicts the locations of areas that are clear to traverse (shown as white cells) as well as obstacles or occupied areas (shown as black cells) in proximity to their respective anchor node.

In accordance with the preferred embodiment, the parameter mapping module 136 identifies nodes having a relative pose uncertainty below a threshold, combines the sensor data for these poses into a single grid, and associates the grid with a single anchor node. The parameter data from grids 520-523, for example, can be combined by overlaying the respective grids 520-523 as shown by the superposition 530 of grids. As one skilled in the art will appreciate, the plurality of grids may overlap in physical extent, possess different orientations in their respective local reference frames, and be of different sizes. Thereafter, data from the superposition 530 of grids may be combined into a single spatial summary associated with a new anchor node, for example. In the alternative, the superposition of spatial summaries may be used to build a global parameter map used to, for example, plan a new path for the robot through the environment. Exemplary parameter maps are shown and discussed in reference to FIGS. 7A and 7B.

Figure 6A:
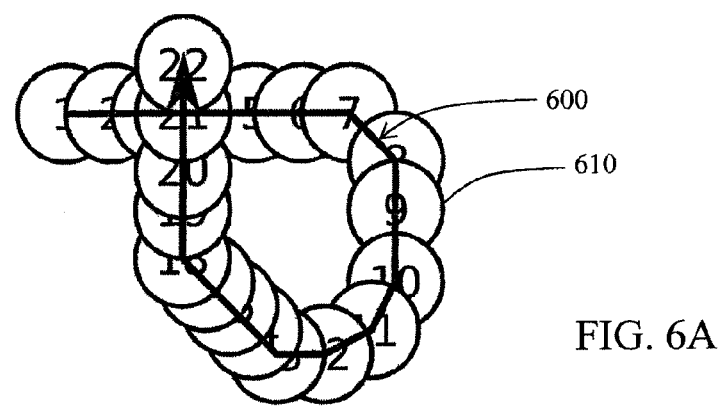
FIG. 6A is a robot trajectory showing nodes, in accordance with the preferred embodiment of the present invention.
Figure 6B:
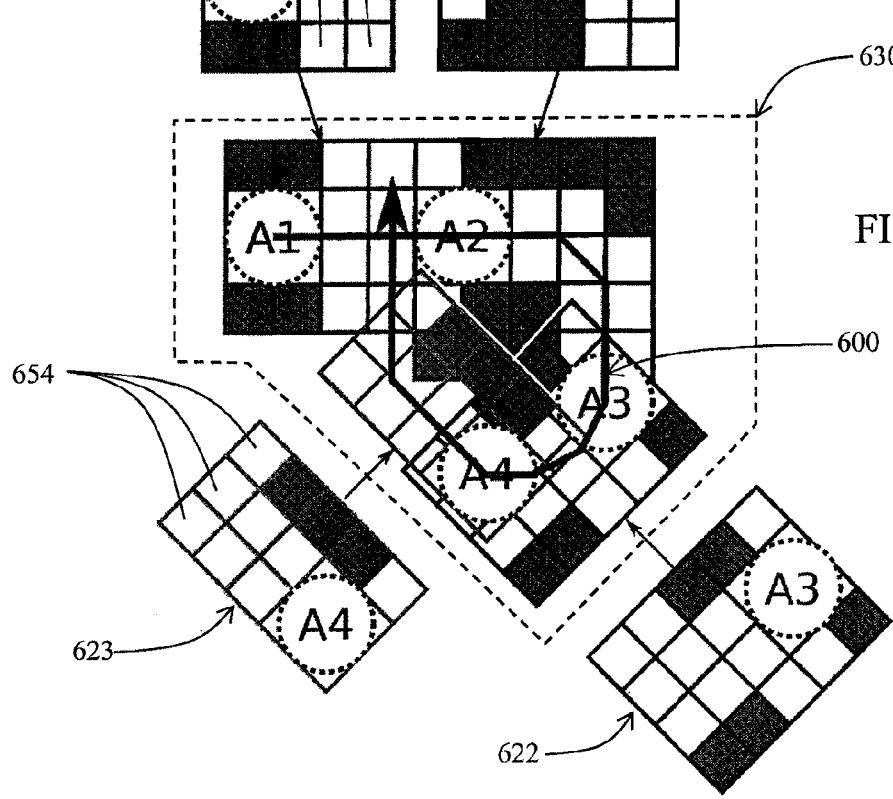
FIG. 6B shows a plurality of local parameter grids, in accordance with the preferred embodiment of the present invention.

Like FIG. 5A-5B, FIG. 6A-6B illustrates a robot path with corresponding nodes and anchor nodes with associated grids. As shown in FIG. 6A, the trajectory of the mobile robot has circled back on itself. In doing so, the robot traverses an area that it previously traversed earlier in its trajectory. As illustrated in FIG. 6B, by looping back, the robot is able to collect additional sensor data that can be used to update one or more previous grids and even modify sensor data used to populate the old version of the same grid. If the current pose of the robotic system is known with sufficient certainty relative to a prior pose, the anchor node associated with the prior pose is retrieved and the new sensor mapped to the grid associated with the prior anchor node.

For example, cells 520, 521 in the grid associated with anchor node A1 and A2 show occupied areas (or unsearched areas) in FIG. 5B. In FIG. 6B, the same cells 650, 652 in corresponding grids 620, 621 for anchor A1 and A2 were updated to show those cells as "clear areas" after the robot traverses the same area a second time. Similarly, new parameter data from sensors 110 is used to introduce new cells 654 to grid 523 in FIG. 5B to create the updated and expanded grid 623 in FIG. 6B. In both examples above, new sensor data collected while looping back is added to a prior grid because the uncertainty associated with the initial pose and later pose was below the acceptable threshold. In doing so, the mapping module 136 effectively updates existing grids with new information without creating new anchor nodes or grids. The present invention, therefore, effectively enables the parameter map to be continually updated with new sensor data without the storage requirements for the sensor data growing linearly with time.

Figures 7A, 7B:
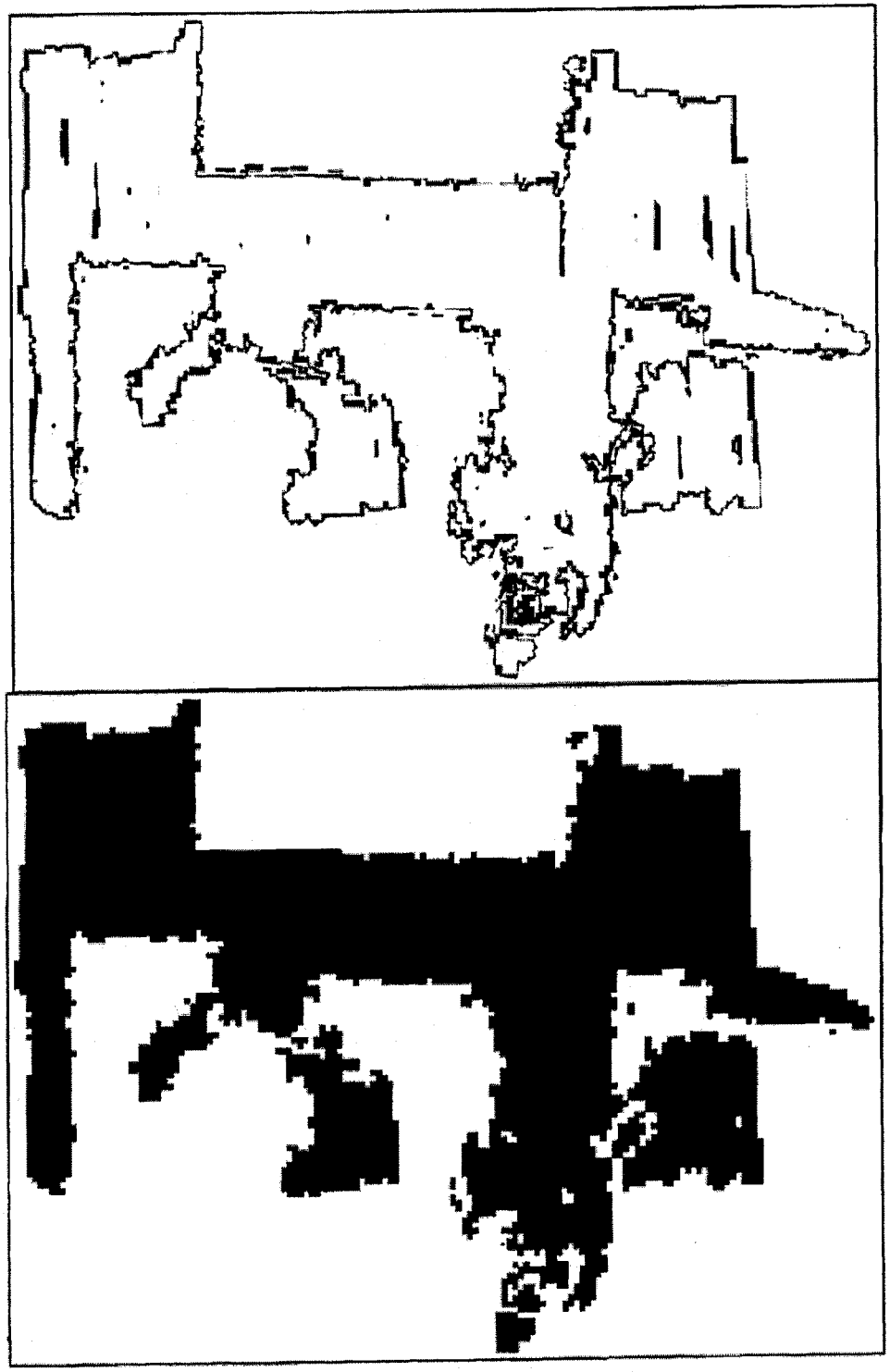
FIG. 7A is an occupancy map depicting clear spaces in the environment explored by the robotic system, in accordance with the preferred embodiment of the present invention.
FIG. 7B is an occupancy map depicting obstacles in the environment explored by the robotic system, in accordance with the preferred embodiment of the present invention.

At any point in time, the grids may be combined to generate a complete parameter map of the entire environment or a portion of the environment for purposes of path planning, for example. A representative parameter map is shown in FIGS. 7A and 7B. In the preferred embodiment, the plurality of grids depicting the presences of obstacles are combined to form an occupancy map of "clear" areas (i.e., open areas free of obstacles) in FIG. 7A and an occupancy map of "obstacles" (e.g., walls that bound the open areas) in FIG. 7B. Grids—also known as summaries when merged—may be combined by overlaying the grids at their respective locations in the global reference frame. The location of each individual grid is defined by the most current estimate of the position and orientation of the respective anchor point. The position and pose of each anchor node, in turn, is regularly updated within the global reference frame as new SLAM data is received and the uncertainties associated with the pose estimates is reduced. The occupancy map shown in FIGS. 7A and 7B are rendered in two dimensions (2D). In other embodiments, the occupancy map or other parameter map may be rendered in three dimensions (3D) if the sensor data and corresponding grids include elevational information, for example.

Figure 8:
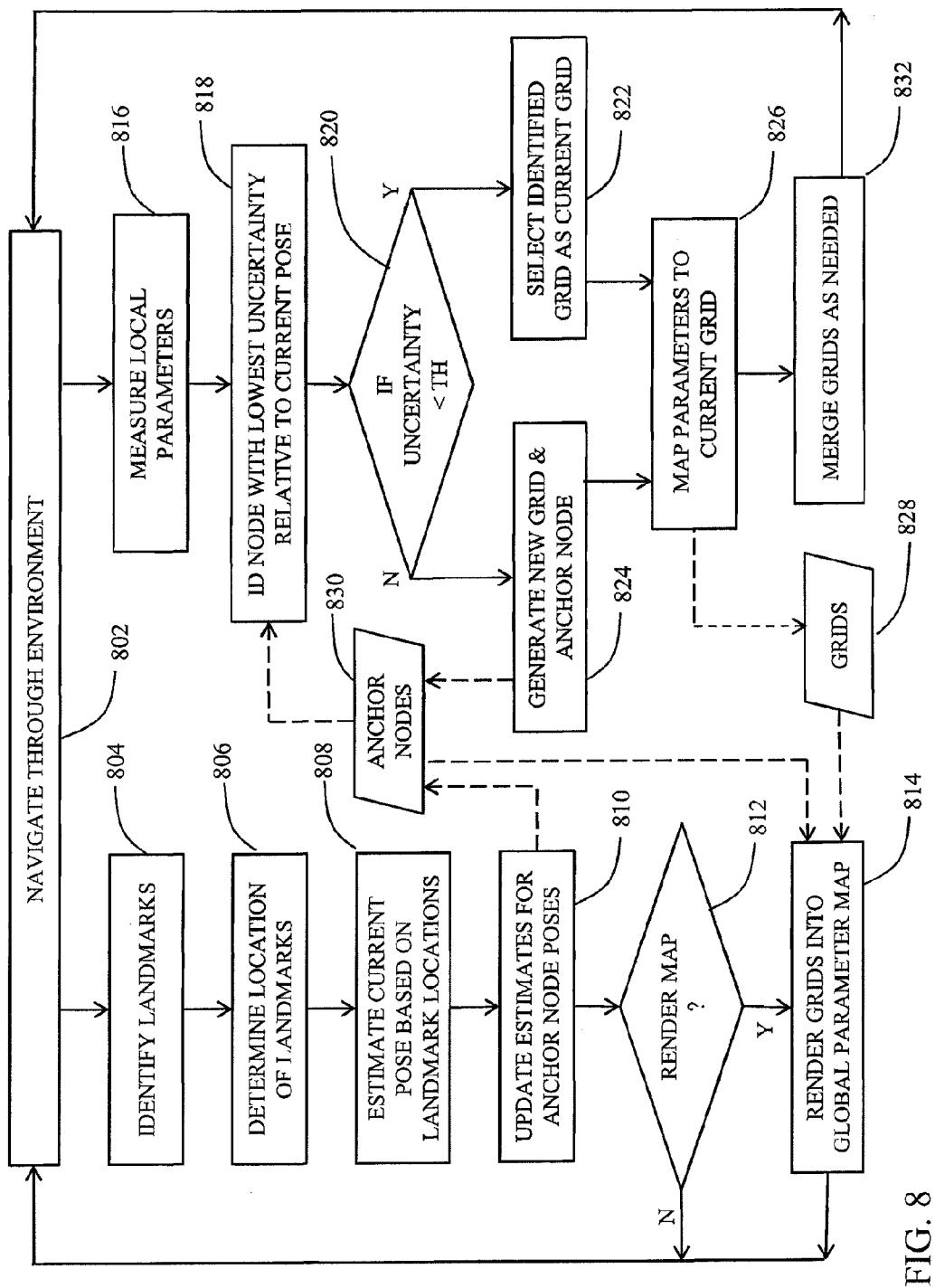
FIG. 8 is a flowchart of the process of concurrent localization and parameter mapping, in accordance with the preferred embodiment of the present invention.

Illustrated in FIG. 8 is a flow chart showing the method of localization and parameter mapping, in accordance with the preferred embodiment of the present invention. In the preferred embodiment, the location and parameter mapping occur concurrently or substantially concurrently while the robotic system navigates 802 through the environment. With respect to localization, the robotic system repeatedly acquires images of the environment with which it identifies 804 landmarks. As the robot traverses the environment, it generally acquires multiple images or other measurements of each landmark which enables it to determine 806 the locations of the landmarks in two dimension (2D) or three dimensional (3D) space. As the map of landmarks is constructed and refined, the robot is able to make increasingly accurate estimates of its current pose 808 as well as the pose associated with each of the anchor nodes 810. The localization system may update the estimated locations of the anchor nodes to generate an occupancy map, for example, in the global reference frame. If an occupancy map is required for path planning for example, the decision block 812 is answered in the affirmative and the updated estimates of the locations of the anchor nodes used to superimpose the associated grids and render 814 the grids into a cohesive map as shown in FIGS. 7A and 7B.

While the robotic system navigates 802 through the environment, it measures 816 local parameters using on-board sensors including the bump sensor. Using the estimate of the current pose, the parameter mapping module searches for and identifies 818 an existing anchor node having the lowest relative pose uncertainty with respect to the current node. The identified node may be the preceding node in the robot path, or a prior node that is closest in distance to the current node. If the relative pose uncertainty between the current node and a prior node is below a predetermined threshold, the decision block 820 is answered in the affirmative. In this case, the grid associated with the prior anchor node is selected 822 to be the current grid and incoming sensor data mapped 826 to this current grid. The uncertainty is determined from the covariance matrix describing the positional uncertainties associated with the localization using the visual SLAM module and odometry sensors, for example. If, however, the uncertainty exceeds the predetermined threshold, the decision block 820 is answered in the negative. In this case, a new anchor node is generated 824 and the incoming sensor data mapped 826 to a new grid associated with the new anchor node. The process of mapping 826 incoming parameter data continues while the uncertainty remains sufficiently low. Over relatively short distances, dead reckoning measurements, such as those obtained from odometry readings, can be quite accurate. As such, the uncertainty remains low and incoming sensor data generally used to populate the current parameter. New nodes tend to be generated after the robot has traveled some distance in a previously unexplored area. New anchor nodes 830 are recorded in the node database 144 and new and updated grids 828 recorded in the grid database 146.

On occasion, the parameter data from a plurality of local grids is merged 832 into one or more spatial summaries. As discussed in detail in FIG. 4, grids may be combined into spatial summaries if the uncertainty associated with the relative pose between the respective anchor nodes is below a threshold. The mapping module 136 periodically attempts to generate spatial summaries in response to any of a number of events or conditions including: (1) elapse time; (2) space covered by the mobile robot or area mapped by the mobile robot; (3) grid memory limitation; (4) total number of grids or anchor nodes; or combination thereof. Moreover, the process of rending a plurality of grids into a global parameter map may be repeated as necessary based on the conditions stated above.

The robotic system of the present invention can be implemented in systems include hardware, software, firmware, or a combination thereof. Hardware can include one or more general purpose computers, microprocessors, application specific integrated circuits (ASICs), field programmable gate arrays (FPGAs), and the like, as well as combinations thereof linked by networking systems, for example. Software may include computer-readable instructions for execution on various processors, computers, servers, or like circuit board or chips. The computer-readable instructions may be affixed in volatile or non-volatile memory including memory chips, hard drives, on compact discs, for example.

The present invention may also be implement in a plurality of platforms including a distributed platform including two or more network-enabled robots that cooperate with a remote central processing unit (CPU), for example, to collect landmark information from a relatively large environment. The CPU may include a personal computer, mobile phone, tablet computer, server, or like device that perform the computation of the processor 130. In some embodiments, the present invention is implemented with a fleet of robots that periodically exchange positioning information and parameter maps (either rendered a single map or as a collection of individual sub-maps) while traversing the environment so that each robot has information on all the parameters explored by other robots.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

What is claimed is:

1. A method of generating a map using mapping parameters acquired by a mobile robotic system in an environment, the method comprising:
  for a given local grid in a plurality of local grids:
    mapping by the mobile robotic system local parameter data to a corresponding grid, wherein the corresponding grid includes a two dimensional Cartesian representation depicting:
      locations of obstacles detected by the mobile robotic system within the environment;
      spaces traversed by the mobile robotic system within the environment; and
  merging by the mobile robotic system parameter data from the plurality of local grids into one or more spatial summaries in response to one or more of:
    elapsed time,
    space covered by the mobile robotic system or area mapped by the mobile robotic system,
    a grid memory limitation, or
    total number of grids or anchor nodes.

2. The method as defined in claim 1, wherein an origin of the two dimensional Cartesian representation coincides with a starting position of the mobile robotic system.

3. The method as defined in claim 1, wherein the given local grid comprises a map of local parameter data located relative to an anchor node, wherein the anchor node represents an estimate of a pose of the mobile robotic system at a location.

4. The method as defined in claim 1, wherein the locations of obstacles detected by the mobile robotic system within the environment comprises obstacles detected by a bump sensor.

5. The method as defined in claim 1, wherein the obstacles detected by the mobile robotic system within the environment comprise walls.

6. A method of generating a map using mapping parameters acquired by a mobile robotic system in an environment, the method comprising:
  mapping by the mobile robotic system parameter data to a grid that includes a two dimensional Cartesian representation depicting:
    locations of obstacles detected by the mobile robotic system within the environment;
    spaces traversed by the mobile robotic system within the environment.

7. The method as defined in claim 6, the method comprising:
  merging by the mobile robotic system parameter data from a plurality of grids into a spatial summary in response to one or more of:
    elapsed time,
    space covered by the mobile robotic system or area mapped by the mobile robotic system,
    a grid memory limitation, or
    total number of grids or anchor nodes;
  wherein:
    an origin of the two dimensional Cartesian representation coincides with a starting position of the mobile robotic system,
    a given grid in the plurality of grids comprises a map of local parameter data located relative to an anchor node, wherein the anchor node represents an estimate of a pose of the mobile robotic system at a location, and
    the locations of obstacles detected by the mobile robotic system within the environment comprises obstacles detected by a bump sensor.

8. The method as defined in claim 6, wherein an origin of the two dimensional Cartesian representation coincides with a starting position of the mobile robotic system.

9. The method as defined in claim 6, wherein the grid comprises a map of local parameter data located relative to an anchor node, wherein the anchor node represents an estimate of a pose of the mobile robotic system at a location.

10. The method as defined in claim 6, wherein the locations of obstacles detected by the mobile robotic system within the environment comprises obstacles detected by a bump sensor.

11. The method as defined in claim 6, wherein the obstacles detected by the mobile robotic system within the environment comprise walls.

* * * * *